(12) United States Patent
Tsuchiya et al.

(10) Patent No.: US 12,024,183 B2
(45) Date of Patent: Jul. 2, 2024

(54) VEHICLE CONTROL DEVICE AND RECORDING MEDIUM

(71) Applicant: Hitachi Astemo, Ltd., Hitachinaka (JP)

(72) Inventors: Ryo Tsuchiya, Tokyo (JP); Kazuyoshi Serizawa, Tokyo (JP); Tomohito Ebina, Tokyo (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 217 days.

(21) Appl. No.: 17/604,836

(22) PCT Filed: Apr. 3, 2020

(86) PCT No.: PCT/JP2020/015287
§ 371 (c)(1),
(2) Date: Oct. 19, 2021

(87) PCT Pub. No.: WO2020/217927
PCT Pub. Date: Oct. 29, 2020

(65) Prior Publication Data
US 2022/0204007 A1 Jun. 30, 2022

(30) Foreign Application Priority Data
Apr. 23, 2019 (JP) ................. 2019-082126

(51) Int. Cl.
*B60W 50/035* (2012.01)
*B60W 40/105* (2012.01)
(Continued)

(52) U.S. Cl.
CPC ........ *B60W 50/035* (2013.01); *B60W 40/105* (2013.01); *B60W 60/001* (2020.02); *B60W 2050/0016* (2013.01); *B60W 2420/42* (2013.01)

(58) Field of Classification Search
CPC ............ B60W 50/035; B60W 40/105; B60W 60/001; B60W 2050/0016;
(Continued)

(56) References Cited

U.S. PATENT DOCUMENTS 5,504,896 A 4/1996 Schell et al.
6,317,638 B1 11/2001 Schreder et al.
(Continued)

FOREIGN PATENT DOCUMENTS

JP 07-212861 A 8/1995
JP 2001-519554 A 10/2001
(Continued)

OTHER PUBLICATIONS

Extended European Search Report dated Jan. 3, 2023 for European Patent Application No. 20796088.1.

*Primary Examiner* — Mohamed Abdo Algehaim
(74) *Attorney, Agent, or Firm* — Volpe Koenig

(57) ABSTRACT

Provided are a vehicle control device and a computer program capable of simplifying design of state transition. An intermediate layer constituting an ECU divides a state of a lower-layer state machine for each function of a vehicle system in association with the state of the lower-layer state machine, and outputs the state to an upper-layer state machine, a state transition table of the upper-layer state machine includes, as a condition of state transition of the upper-layer state machine, a current state of a lower-layer state machine or a state to transition, and the upper-layer state machine receives the state of the lower-layer state machine input from the intermediate layer, refers to the state transition table, and outputs a signal for controlling the vehicle system.

7 Claims, 15 Drawing Sheets

(51) Int. Cl.
*B60W 50/00* (2006.01)
*B60W 60/00* (2020.01)

(58) Field of Classification Search
CPC ..... B60W 2420/42; B60W 2050/0215; B60W 50/0205; B60W 2050/143; B60W 50/14; B60W 60/0053; B60W 60/00186; B60W 50/00; B60W 60/0059; B60W 2050/0005; G06F 9/4498; G06F 11/3089; G06F 11/3055; G06F 11/3013
USPC .......................................................... 701/1
See application file for complete search history.

(56) References Cited

U.S. PATENT DOCUMENTS

| | | | | |
|---|---|---|---|---|
| 9,082,073 | B2* | 7/2015 | Miller | G06N 5/02 |
| 9,785,847 | B2* | 10/2017 | Dlugosch | G06V 10/94 |
| 10,459,441 | B2* | 10/2019 | Zhuang | B60W 50/035 |
| 10,949,198 | B1* | 3/2021 | Weston | G06F 8/76 |
| 2005/0035784 | A1* | 2/2005 | Gould | G06F 9/4498 |
| | | | | 326/46 |
| 2010/0198488 | A1* | 8/2010 | Groitzsch | G08G 1/163 |
| | | | | 701/117 |
| 2012/0010772 | A1* | 1/2012 | Pack | G05D 1/0088 |
| | | | | 701/27 |
| 2013/0212054 | A1* | 8/2013 | Shankar | G06F 8/10 |
| | | | | 706/45 |
| 2013/0290925 | A1* | 10/2013 | Shankar | G06F 8/10 |
| | | | | 717/105 |
| 2015/0134178 | A1* | 5/2015 | Minoiu-Enache | B60W 50/035 |
| | | | | 701/23 |
| 2015/0324129 | A1 | 11/2015 | Brown et al. | |
| 2016/0110199 | A1* | 4/2016 | Kim | G06F 9/4498 |
| | | | | 712/242 |
| 2018/0267784 | A1* | 9/2018 | Wang | G06F 8/433 |
| 2018/0367365 | A1* | 12/2018 | Jiang | G06F 9/4498 |
| 2020/0269876 | A1* | 8/2020 | Ando | B60W 60/0059 |

FOREIGN PATENT DOCUMENTS

| | | |
|---|---|---|
| JP | 2010-528398 A | 8/2010 |
| JP | 2015-518447 A | 7/2015 |

\* cited by examiner

| STATE TRANSITION TABLE OF LOWER LAYER 1 | NORMAL | PERFORMANCE LIMIT | ABNORMAL |
|---|---|---|---|
| ABNORMALITY OCCURRENCE OF SENSOR | ABNORMAL | ABNORMAL | |
| PERFORMANCE LIMIT OF SENSOR | PERFORMANCE LIMIT | PERFORMANCE LIMIT | |
| RECOVERY OF SENSOR | | NORMAL | |

FIG. 6B

STATE TRANSITION TABLE OF LOWER LAYER 2 — 113A

| | NORMAL | PERFORMANCE LIMIT | ABNORMAL |
|---|---|---|---|
| ABNORMALITY OCCURRENCE OF SENSOR | ABNORMAL | ABNORMAL | |
| PERFORMANCE LIMIT OF SENSOR | PERFORMANCE LIMIT | PERFORMANCE LIMIT | |
| RECOVERY OF SENSOR | | NORMAL | |

FIG. 7A

STATE TRANSITION TABLE OF INTERMEDIATE LAYER 1 — 602, 113B

| | NORMAL | PERFORMANCE LIMIT | ABNORMAL |
|---|---|---|---|
| ABNORMALITY OCCURRENCE OF LOWER LAYER | ABNORMAL | ABNORMAL | ABNORMAL |
| PERFORMANCE LIMIT OF LOWER LAYER | PERFORMANCE LIMIT | PERFORMANCE LIMIT | ABNORMAL |
| RECOVERY OF LOWER LAYER | | [PERFORMANCE-LIMITED SENSOR < 1] NORMAL OR [PERFORMANCE-LIMITED SENSOR > 0] PERFORMANCE LIMIT | ABNORMAL |

STATE TRANSITION TABLE OF INTERMEDIATE LAYER 2

113C

| | NORMAL | PERFORMANCE LIMIT | ABNORMAL |
|---|---|---|---|
| ABNORMALITY OCCURRENCE OF LOWER LAYER | ABNORMAL | ABNORMAL | ABNORMAL |
| PERFORMANCE LIMIT OF LOWER LAYER | PERFORMANCE LIMIT | PERFORMANCE LIMIT | ABNORMAL |
| RECOVERY OF LOWER LAYER | | [PERFORMANCE-LIMITED SENSOR < 1] NORMAL OR [PERFORMANCE-LIMITED SENSOR > 0] PERFORMANCE LIMIT | ABNORMAL |

FIG. 8

STATE TRANSITION TABLE OF UPPER LAYER — 604

113D

605

| | NORMAL | FUNCTION RESTRICTION | DRIVER TAKEOVER WAITING |
|---|---|---|---|
| INTERMEDIATE LAYER TRANSITION TO ABNORMAL | [NORMAL SENSOR<2] DRIVER TAKEOVER WAITING OR [NORMAL SENSOR>1] FUNCTION RESTRICTION | [NORMAL SENSOR<2] DRIVER TAKEOVER WAITING OR [NORMAL SENSOR>1] FUNCTION RESTRICTION | DRIVER TAKEOVER WAITING |
| INTERMEDIATE LAYER TRANSITION TO PERFORMANCE LIMIT | [NORMAL SENSOR<2] DRIVER TAKEOVER WAITING OR [NORMAL SENSOR>1] NORMAL | FUNCTION RESTRICTION | DRIVER TAKEOVER WAITING |
| INTERMEDIATE LAYER TRANSITION TO NORMAL | | NORMAL | |

| | RIGHT-SIDE INTERMEDIATE LAYER | ... |
|---|---|---|
| FRONT RIGHT CAMERA | O | |
| FRONT LEFT CAMERA | | |
| FRONT RIGHT LiDAR | O | |
| FRONT LEFT LiDAR | | |
| FRONT RIGHT Radar | O | |
| FRONT LEFT Radar | | |
| ... | | |

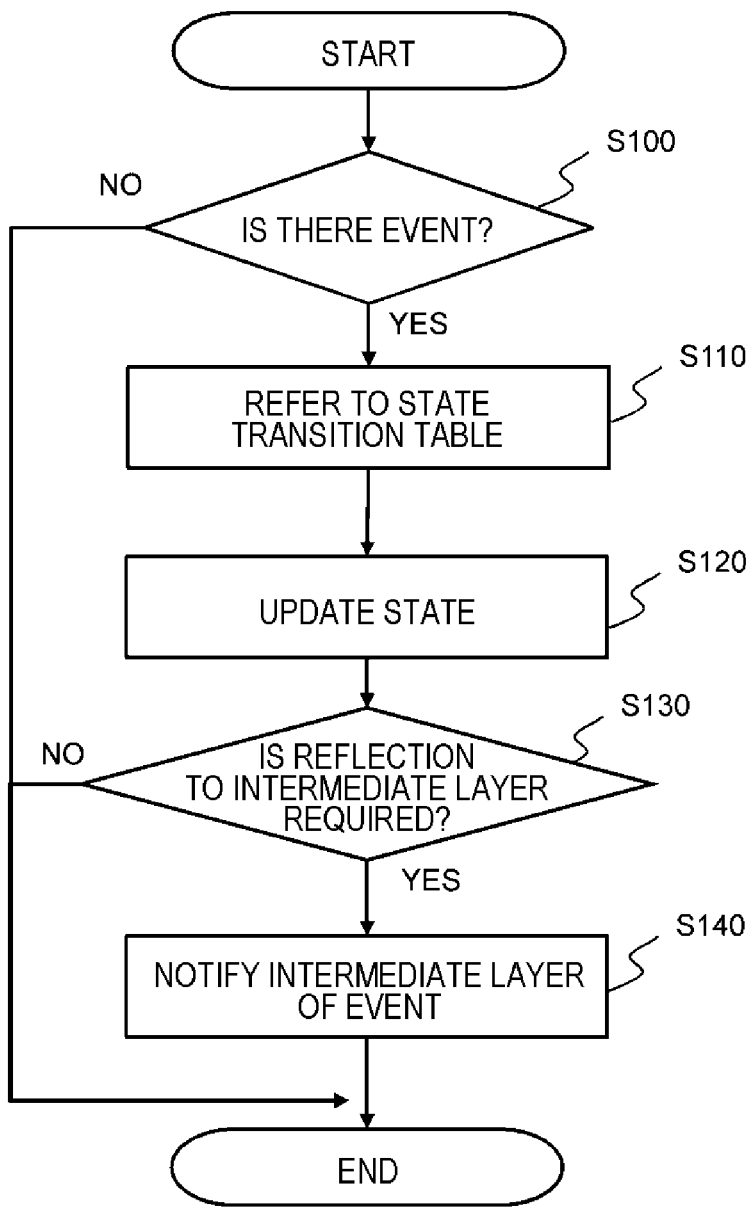

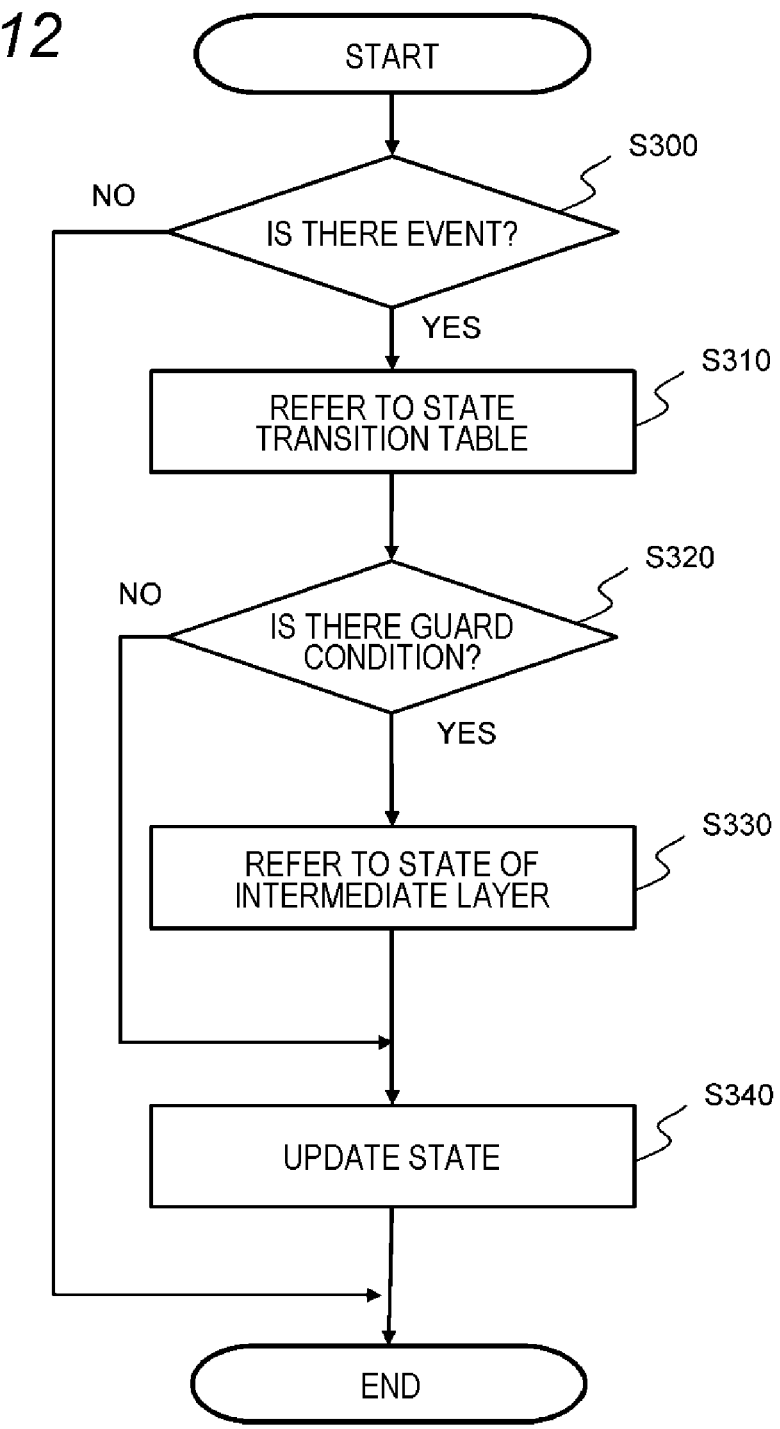

| STATE MACHINE | CURRENT STATE |
|---|---|
| INTERMEDIATE LAYER 1 | NORMAL |
| INTERMEDIATE LAYER 2 | NORMAL |
| INTERMEDIATE LAYER 3 | NORMAL |
| ... | ... |

| STATE MACHINE | CURRENT STATE |
|---|---|
| LOWER LAYER 1 | NORMAL |
| LOWER LAYER 2 | NORMAL |
| LOWER LAYER 3 | NORMAL |
| ... | ... |

VEHICLE CONTROL DEVICE AND RECORDING MEDIUM

TECHNICAL FIELD

The present invention relates to a vehicle control device and a computer program.

BACKGROUND ART

The complexity of an automatic driving system increases with the improvement of an automatic driving level and the expansion of an adaptation area. The automatic driving system needs not only to stop coping with a failure on the spot, and but also to continue automatic traveling even after a failure such as safe handover to a driver or deceleration to a safe speed. A large number of recognition devices represented by sensors are connected to a vehicle control device represented by an automatic driving electronic control unit (ECU) that realizes such an automatic driving system, and a large number of applications operate under various operation conditions in the vehicle control device. Accordingly, the design of state transition in the vehicle control device tends to be complicated.

As a technology for inserting an intermediate layer in order to simplify a complicated correspondence between state machines having different hierarchies, for example, there is a technology described in PTL 1. PTL 1 discloses a programming method for system state transition in a control system in which a system state is defined by a combination of a plurality of state machines. The programming method includes inputting a layer structure representing a configuration of the state machine, inputting an operation specification of each state machine, mapping the input operation specification of each state machine to a combination of the operation specification of the state machines corresponding to child nodes on the layer structure, storing information on the input mapping, and executing the state transition of each layer based on the stored information on the mapping when an event occurs.

CITATION LIST

Patent Literature

PTL 1: JP H07-212861 A

SUMMARY OF INVENTION

Technical Problem

However, the technology disclosed in PTL 1 does not describe how to integrate the intermediate layer. In a case where state transition of a vehicle control device used in an advanced automatic driving system is designed, the complexity of the design of the state transition cannot be reduced unless an appropriate intermediate layer is provided.

In particular, since the automatic driving system has a large number of recognition devices, the number of lower-layer state machines to which events from recognition devices are input also increases. Thus, a relationship between which state machine of the intermediate layer receives an output from the lower-layer state machine becomes complicated, the complexity of the design of the state transition tends to increase.

The present invention has been made in view of the above problems, and an object of the present invention is to provide a vehicle control device and a computer program capable of simplifying design of the state transition.

Solution to Problem

In order to solve the above problems, a vehicle control device according to one aspect of the present invention that controls a vehicle system, and includes a control unit that has a first state machine and a second state machine that are hierarchized, and an intermediate layer provided between the first state machine and the second state machine and a storage unit that stores a plurality of state transition tables provided for the first state machine and the second state machine, current states of the first state machine and the second state machine, states to transition, conditions of state transition being described in the state transition tables. The first state machine receives an event input from the vehicle system, refers to the state transition table, and outputs the state of the first state machine to the intermediate layer, the intermediate layer divides the state of the first state machine for each function of the vehicle system in association with the state of the first state machine, and outputs the state to the second state machine, the state transition table corresponding to the second state machine includes, as the condition of the state transition of the second state machine, the current state of the first state machine or the state to transition, and the second state machine receives the state of the first state machine input from the intermediate layer, refers to the state transition table, and outputs a signal for controlling the vehicle system.

Advantageous Effects of Invention

According to the present invention, it is possible to realize a vehicle control device and a computer program capable of simplifying the design of the state transition.

BRIEF DESCRIPTION OF DRAWINGS

FIG. 6B is a diagram illustrating another example of the state transition table of the lower layer according to the first embodiment.

FIG. 7A is a diagram illustrating an example of a state transition table of an intermediate layer according to the first embodiment.

FIG. 7B is a diagram illustrating another example of the state transition table of the intermediate layer according to the first embodiment.

FIG. 8 is a diagram illustrating an example of a state transition table of an upper layer according to the first embodiment.

FIG. 9A is a diagram illustrating a sensor belonging to a right-side intermediate layer according to the first embodiment.

FIG. 10 is a flowchart illustrating an example of processing of the lower-layer state machine according to the first embodiment.

FIG. 12 is a flowchart illustrating an example of processing of the upper-layer state machine according to the first embodiment.

FIG. 13A is a diagram illustrating an example of a state list of the upper-layer state machine according to the first embodiment.

DESCRIPTION OF EMBODIMENTS

Hereinafter, embodiments of the present invention will be described with reference to the drawings. The embodiments to be described below do not limit inventions according to the claims, and all elements and combinations thereof described in the embodiments are not essential for the solution of the invention.

In the following description, processing may be described with a "program" as an operation subject.

Since processing is appropriately performed while using an appropriate storage resource (for example, memory) and/or an interface device (for example, keyboard) by a processor (for example, central processing unit (CPU)) executing a program, all processing to be described below may be the processor. The processing described with the program as the operation subject may be processing performed by a device including the processor. A dedicated hardware circuit that performs a part or all of the processing performed by the processor may be included. A computer program may be installed on a device from a program source. The program source may be, for example, a program distribution server or a non-transitory computer-readable storage medium.

A vehicle control device according to the present embodiment is a vehicle control device that controls a vehicle system. The vehicle control device includes a control unit that has a lower-layer state machine which is a first state machine and an upper-layer state machine which is a second state machine that are hierarchized, and an intermediate layer provided between the first state machine and the second state machine. The vehicle control device divides the state of the first state machine for each function of the vehicle system in association with the state of the first state machine, and outputs the state to the second state machine.

Preferably, the intermediate layers are integrated according to conditioning for switching between operations of the vehicle system, and are provided for recognition directions of recognition devices such as sensors of the vehicle system or target objects targeted by the recognition devices. More specifically, the intermediate layer is provided according to a determination criterion of behavior control of automatic driving in the upper-layer state machine. Accordingly, the second state machine can smoothly and reliably switch between the operations of the vehicle system by referring to the state transition of the intermediate layer.

First Embodiment

Figure 1:
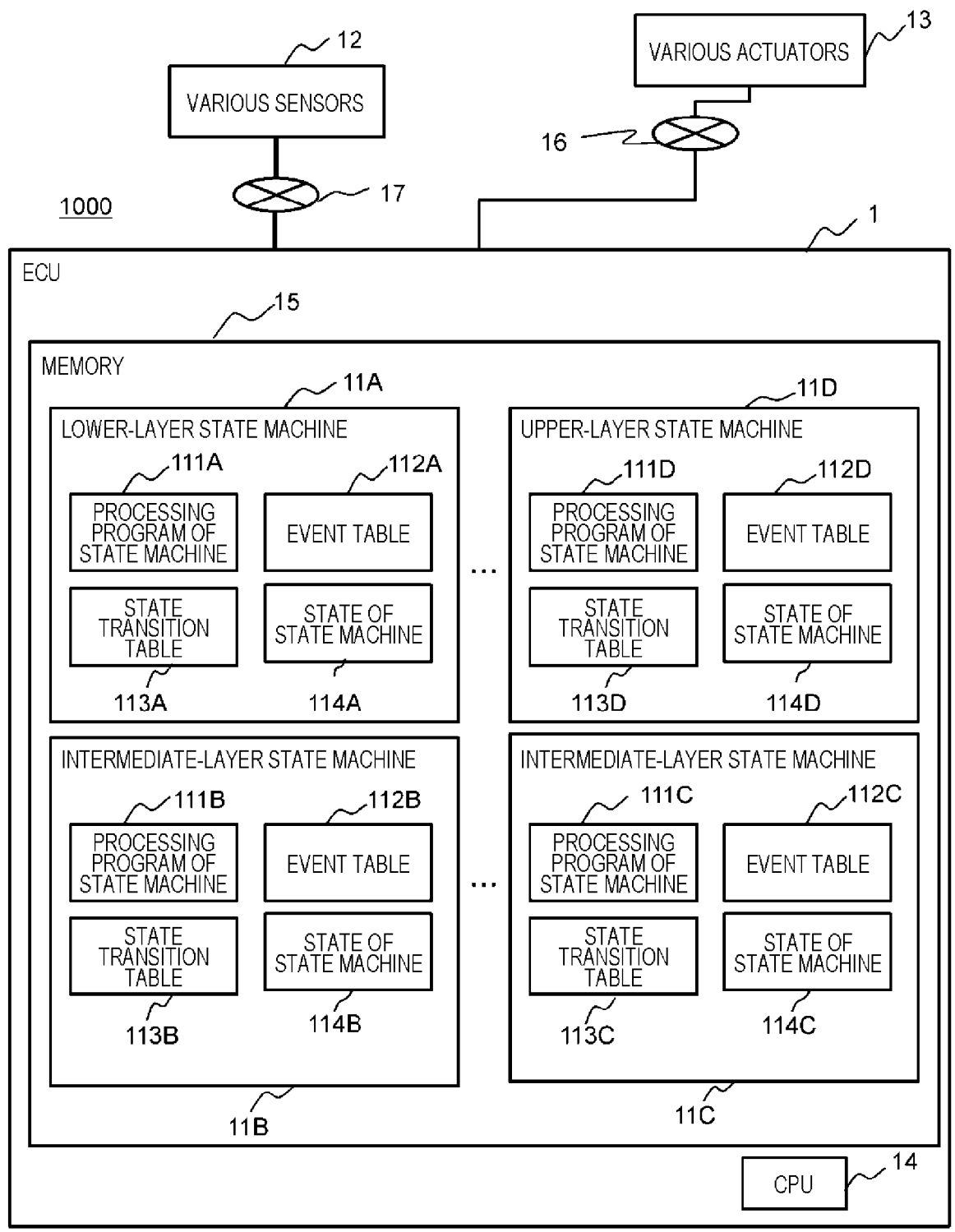
FIG. 1 is an overall configuration diagram of a vehicle control device according to a first embodiment.

FIG. 1 is an overall configuration diagram of a vehicle control device according to a first embodiment.

A vehicle system 1000 according the first embodiment is a system mounted on a vehicle such as an automobile, and includes various sensors 12, various actuators 13, and an ECU 1 which is an example of a vehicle control device. The various sensors 12 and the various actuators 13 can communicate with the ECU 1 via in-vehicle networks 16 and 17. The in-vehicle networks 16 and 17 may be any communication networks such as Ethernet (registered trademark) and CAN-FD (CAN with Flexible Data-Rate).

The various sensors 12 which are recognition devices include one or more sensors for capturing information on a surrounding environment of the vehicle, such as a radar, a light detection and ranging (LiDAR), and a camera. The various sensors 12 output pieces of state information of the sensors to the ECU 1.

The various actuators 13 include one or more actuators for operating an accelerator, a brake, and a steering wheel for operating traveling of the vehicle. The various actuators 13 control the traveling of the vehicle based on input control information from the ECU 1.

The ECU 1 includes a CPU 14 and a memory 15. The CPU 14 executes each processing according to a program stored in the memory 15. The memory 15 is, for example, a random access memory (RAM) or a read only memory (ROM), and stores a program executed by the CPU 14 and necessary information.

The ECU 1 may include an arithmetic element capable of performing various kinds of information processing, for example, a field-programmable gate array (FPGA) or the like, instead of the CPU 14. The ECU 1 may include, as the memory 15, a magnetic storage medium such as a hard disk drive (HDD), a semiconductor storage medium such as a solid state drive (SSD), or the like, in addition to the RAM and the ROM.

In the memory 15, processing programs 111A, 111B, 111C, and 111D of state machines, event tables 112A, 112B, 112C, and 112D, state transition tables 113A, 113B, 113C, and 113D, and states 114A, 114B, 114C, and 114D of state machines are stored as a lower-layer state machine (first state machine) 11A, intermediate-layer state machines 11B and 11C, and an upper-layer state machine (second state machine) 11D. Functions of the programs will be described later.

In the following description, the program may be described as the operation subject for the sake of convenience, but an actual execution subject is the CPU 14 that executes the program.

Although one lower-layer state machine 11A and two intermediate-layer state machines 11B and 11C are illustrated in FIG. 1, the number of lower-layer state machines and the number of intermediate-layer state machines are not limited to the illustrated example.

Next, a functional configuration diagram of the ECU 1 will be described with reference to FIGS. 2 to 4.

Figure 2:
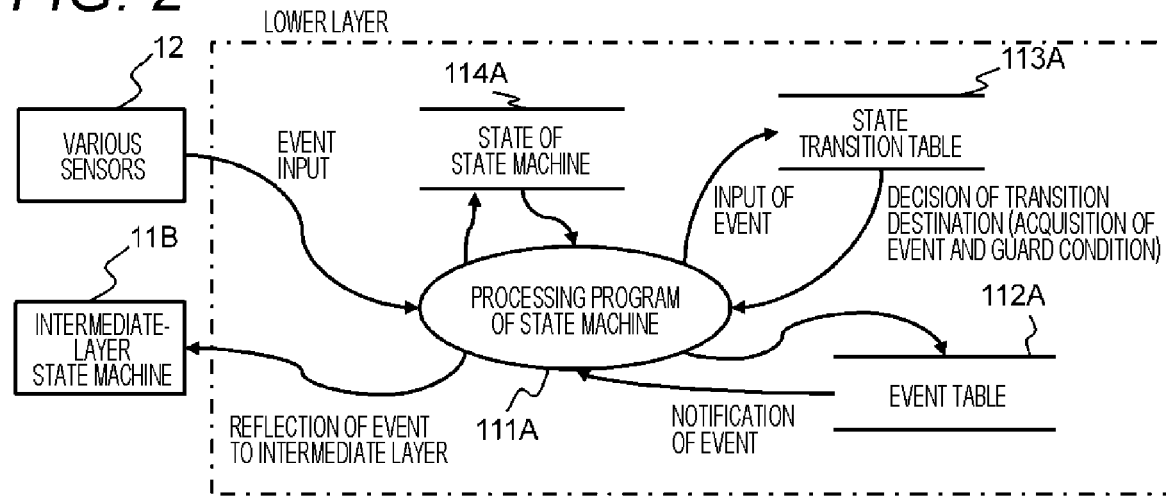
FIG. 2 is a diagram illustrating an example of a functional configuration of a lower-layer state machine according to the first embodiment.

FIG. 2 is a diagram illustrating an example of a functional configuration of the upper-layer state machine 11D according to the first embodiment. In FIGS. 2 to 4, the functional configuration is described in a Data Flow Diagram format.

The processing program 111A of the lower-layer state machine 11A (actually, a functional unit constituted by the CPU 14 that executes the processing program of the lower-layer state machine) receives event inputs from the various sensors 12 (pieces of state information of the sensors), stocks events from the various sensors 12 in the event table 112A, refers to the state transition table 113A based on the event and the state 114A of the state machine, and updates the state 114A of the state machine. After the state 114A is updated, pieces of information on the event and a guard condition are output to the intermediate-layer state machine 11B.

Figure 3:
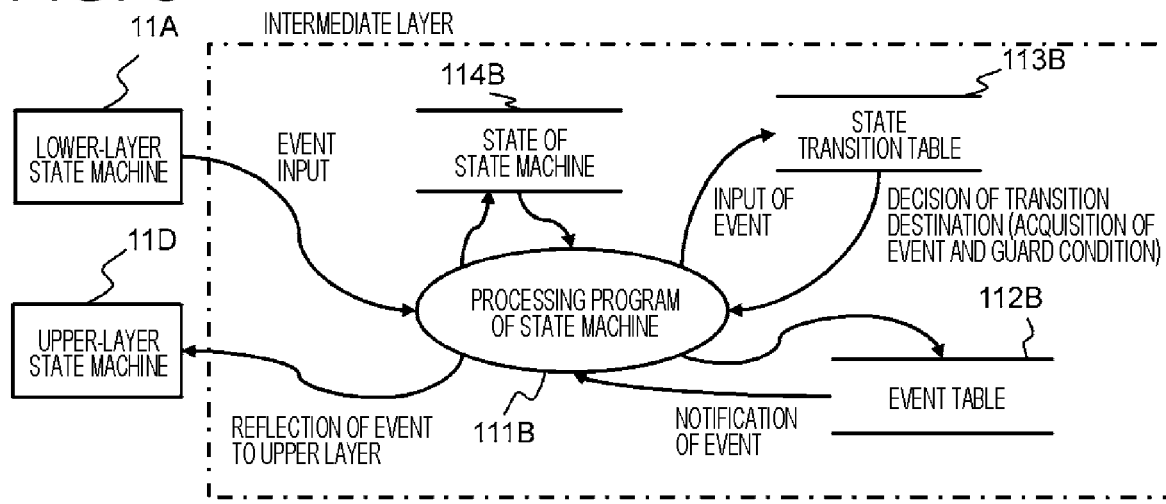
FIG. 3 is a diagram illustrating an example of a functional configuration of an intermediate-layer state machine according to the first embodiment.

FIG. 3 is a diagram illustrating an example of a functional configuration of the intermediate-layer state machine 11B according to the first embodiment. Although the ECU 1 according to the present embodiment includes the plurality of intermediate-layer state machines 11B and 11C, since these intermediate-layer state machines have the same functional configuration, the functional configuration of the intermediate-layer state machine 11B will be described here.

The processing program 111B of the intermediate-layer state machine 11B stocks the input event from the processing program 111A of the lower-layer state machine 11A in the event table 112B, refers to the state transition table 113B based on the event and the state 114B of the state machine, and updates the state 114B of the state machine. After the state is updated, the pieces of information on the event and the guard condition are output to the upper-layer state machine 11D.

Figure 4:
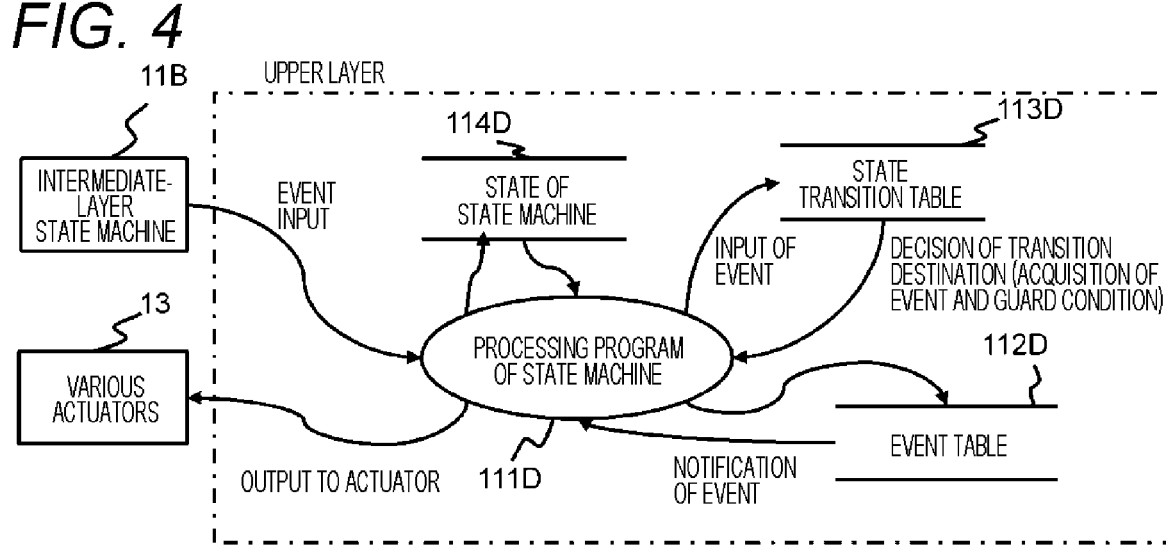
FIG. 4 is a diagram illustrating an example of a functional configuration of an upper-layer state machine according to the first embodiment.

FIG. 4 is a diagram illustrating an example of a functional configuration of the upper-layer state machine 11D according to the first embodiment.

The processing program 111D of the upper-layer state machine 11D stocks the input event from the processing program 111B or 111C of the intermediate-layer state machine 11B or 11C in the event table 112D, refers to the state transition table 113D based on the event and the state 114D of the state machine, and updates the state 114D of the state machine. After the state is updated, control information is output to the various actuators 13.

Figures 5, 6A:
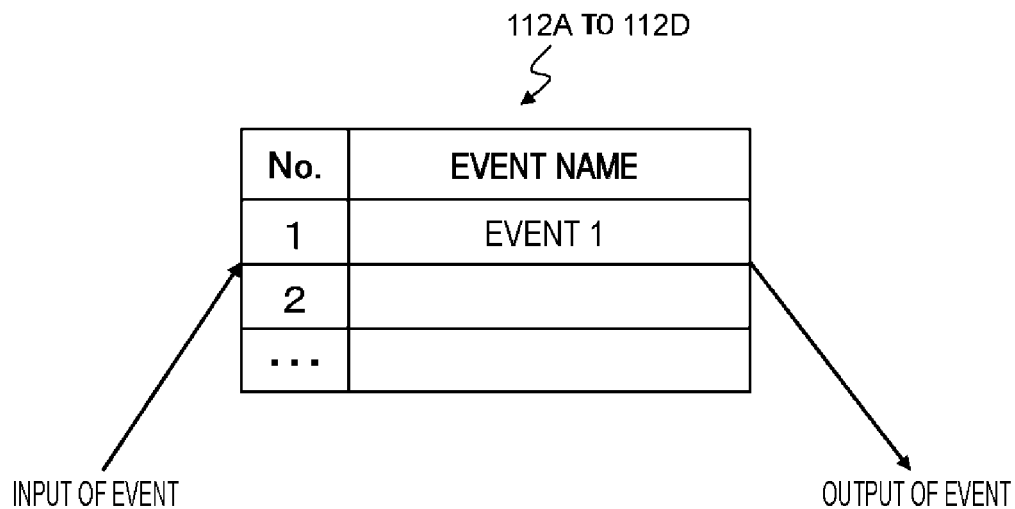
FIG. 5 is a diagram illustrating an example of an event table according to the first embodiment.
FIG. 6A is a diagram illustrating an example of a state transition table of a lower layer according to the first embodiment.

FIG. 5 is a diagram illustrating an example of the event table according to the first embodiment. The event tables 112A to 112D illustrated in FIGS. 1 to 4 have the same data structure.

The event tables 112A to 112D are tables for stocking the events output from the sensors 12, the lower-layer state machine 11A, and the intermediate-layer state machines 11B and 11C. In a case where a plurality of events is stocked, the events may be reflected in the order of receipt, or a priority may be separately determined in advance and may be reflected in the order of the priority.

FIGS. 6A and 6B are diagrams illustrating the state transition tables 113A of the lower layer according to the first embodiment. FIGS. 6A and 6B illustrate an example in which the ECU 1 has two lower-layer state machines. Since the state transition tables 113A illustrated in FIGS. 6A and 6B have substantially the same data structure, FIG. 6A will be described.

A vertical axis of the state transition table 113A represents the events input from the various sensors 12 to the lower-layer state machine 11A, a horizontal axis represents the state of the lower-layer state machine 11A, and each cell represents a state to transition when the event occurs. For example, in a case where an abnormality occurrence 601 of the sensor 12 occurs in a normal state 600, the lower-layer state machine 11A transitions to an abnormal state. In the state transition table 13A of the lower layer, a transition destination of the lower-layer state machine is decided according to the input events from the various sensors 12 and a current state of the lower-layer state machine 11A.

FIGS. 7A and 7B are diagrams illustrating examples of the state transition tables 113B and 113C of the intermediate layers according to the first embodiment. Since the state transition tables 113B and 113C illustrated in FIGS. 7A and 7B have substantially the same data structure, FIG. 7A will be described.

A vertical axis, a horizontal axis, and each cell of the state transition table 113B of the intermediate layer are the same as those of the state transition table 113A of the lower layer except for points to be described below. Among the cells in the state transition table 113B of the intermediate layer, there is a cell including [ ], and the guard condition is described in [ ].

Here, when a certain event occurs in a certain state, the state may or may not transition to another state, or the transition destination may vary. In this case, a condition for deciding the transition destination is referred to as a guard condition.

For example, when the state of the intermediate-layer state machine 11B is a state of performance limit 602, in a case where the state of the lower-layer state machine 11A transitions to a state of recovery 603, the transition destination varies depending on the number of sensors in the performance limit state in the lower-layer state machine 11A. More specifically, the state of the intermediate-layer state machine 11B transitions to the normal state in a case where there is no sensor in the performance limit state, and transitions to the performance limit state in a case where there is a sensor in the performance limit state. In the state transition table 113B of the intermediate layer, the transition destination of the intermediate-layer state machine 11B is decided by the input event from the lower-layer state machine 11A, the current state, and the guard condition.

FIG. 8 is a diagram illustrating an example of the state transition table 113D of the upper layer according to the first embodiment.

A vertical axis, a horizontal axis, and each cell of the state transition table 113D of the upper layer are the same as those of the state transition tables 113B and 113C of the intermediate layers. For example, when the state of the upper-layer state machine 11D is a normal state 604, in a case where the state of the intermediate-layer state machine 11B or 11C transitions to a state of abnormality 605, the transition destination varies depending on the number of sensors in the normal state in the intermediate-layer state machine 11B or 11C. More specifically, the state of the upper-layer state machine 11D transitions to a driver takeover state in a case where the number of normal sensors is less than two, and transitions to a function restriction state in a case where the number of normal sensors is equal to or more than two. In the state transition table 113D of the upper layer, the transition destination of the upper-layer state machine 11D is decided by the input event from the intermediate-layer state machine 11B or 11C, the current state, and the guard condition.

Figure 9B:
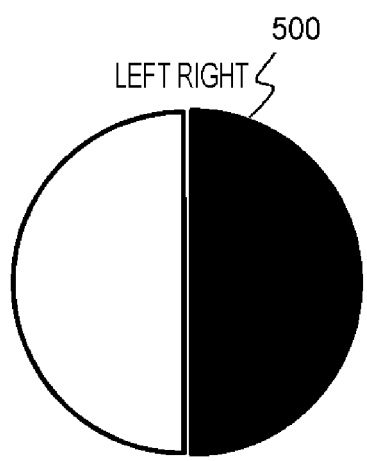
FIG. 9B is a diagram illustrating an example of an intermediate layer according to the first embodiment.

FIG. 9A is a diagram illustrating sensors belonging to the right-side intermediate layer according to the first embodiment, and FIG. 9B is a diagram illustrating an example of the intermediate layers according to the first embodiment.

In the example illustrated in FIG. 9B, two intermediate layers (a right-side intermediate layer 500 and a left-side intermediate layer) are provided. As illustrated in FIG. 9A, when the vehicle is divided into left and right sides with an axis extending along a traveling direction as a center, an event from a sensor located on the right side of the vehicle or having a detection direction of the sensor 12 on the right side of the vehicle is input to the right-side intermediate layer 500.

In other words, in the example illustrated in FIG. 9B, the intermediate-layer state machine is divided based on installation locations of the recognition devices exemplifying the various sensors 12 or recognition directions of the recognition devices, and events from the recognition devices of which the installation locations or recognition directions (detection directions of the sensors 12) are on the right side of the vehicle are input to the right-side intermediate layer 500.

The intermediate layer illustrated in FIG. 9B is merely an example, and a form in which the intermediate layer is provided may be changed and adapted according to a condition for causing the state of the upper-layer state machine 11D to transition. For example, the intermediate layer may be provided for each detection direction of the sensor 12 and/or target object targeted by the sensor. Examples of the target object include a stationary body, a moving body, a signal, and the like. The intermediate layer is provided for each detection direction and/or target object, and thus, it is possible to detect which part of the vehicle has failed and which detection has become difficult.

As stated above, the intermediate layer is provided for each condition for causing the state of the upper layer to transition, and thus, operations of the ECU 1 can be switched.

Next, tasks of state transition processing of the lower-layer, intermediate-layer, and upper-layer state machines will be described.

FIG. 10 is a flowchart illustrating an example of the processing of the lower-layer state machine 11A according to the first embodiment.

The state transition processing illustrated in the flowchart of FIG. 10 is executed by the CPU 14 executing the processing program 111A of the lower-layer state machine 11A. The state transition processing illustrated in FIG. 10 is executed, for example, when the state of the sensor 12 transitions. Hereinafter, the processing of the processing program 111A of the state machine of the lower-layer state machine 11A will be described.

The events are input from the various sensors 12, and thus, the events are stocked in the event table 112A (YES in S100). In this case, the processing program 111A of the lower-layer state machine 11A refers to the state transition table 113A based on the stocked event and the state 114A of the lower-layer state machine 11A (S110), and updates the state of the lower-layer state machine (S120).

In a case where it is determined that reflection to the intermediate layer is required (YES in S130), the processing program 111A of the state machine notifies the intermediate layer of the event (S140), and ends the processing.

On the other hand, in a case where the event is not stocked in the event table 112A (NO in S100) or in a case where it is determined that the reflection to the intermediate layer is not required (NO in S130), the processing program 111A of the state machine ends the processing at this time.

Figure 11:
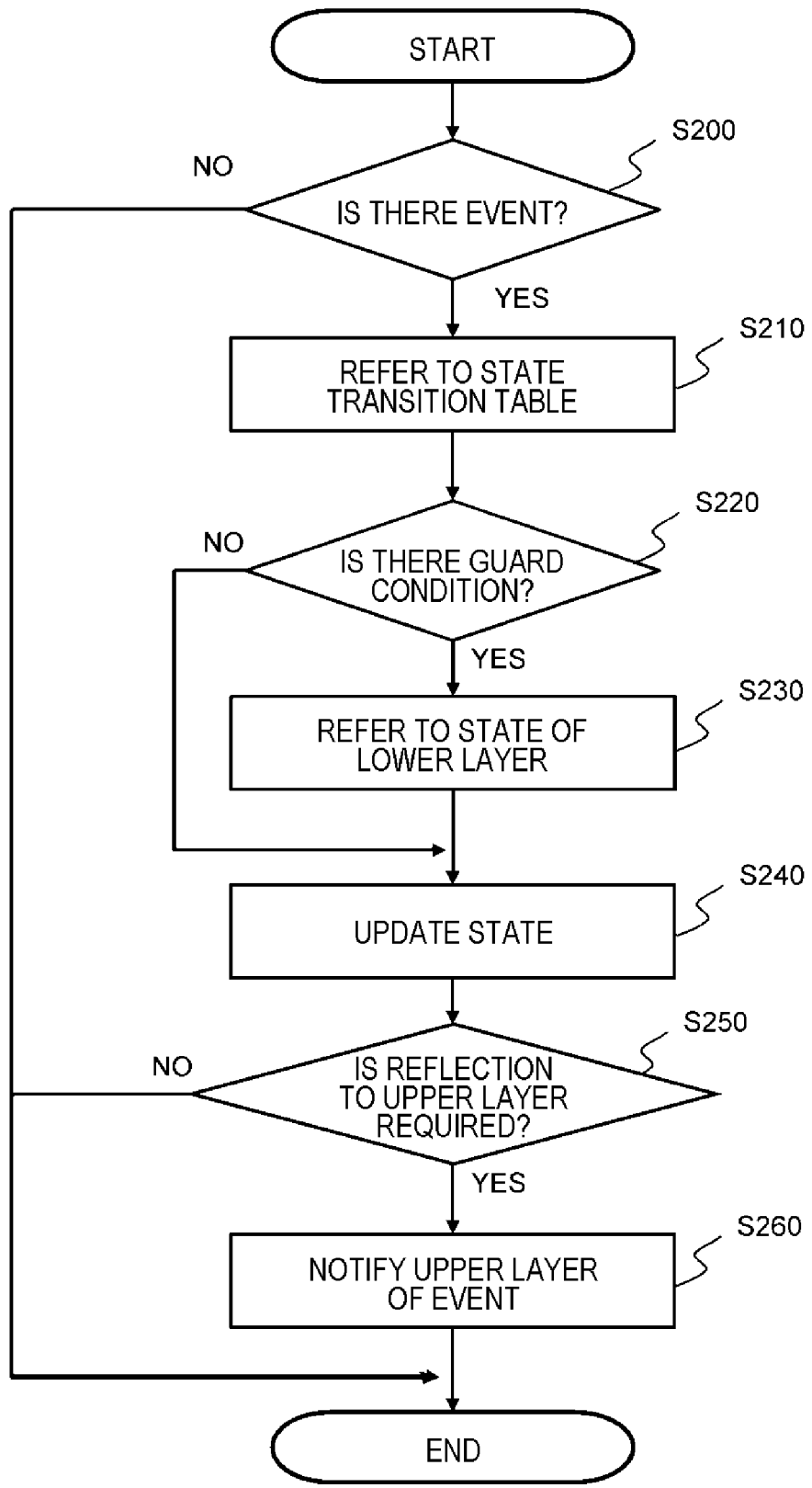
FIG. 11 is a flowchart illustrating an example of processing of the intermediate-layer state machine according to the first embodiment.

FIG. 11 is a flowchart illustrating an example of the processing of the intermediate-layer state machine 11B or 11C according to the first embodiment.

The state transition processing illustrated in the flowchart of FIG. 11 is executed by the CPU 14 executing the processing program 111B or 111C of the intermediate-layer state machine 11B or 11C. The state transition processing illustrated in FIG. 11 is executed when the state of the lower-layer state machine 11A transitions. Since the tasks of state transition processing executed by the processing programs 111B and 111C of the intermediate-layer state machines 11B and 11C are substantially the same, the processing of the processing program 111B of the intermediate-layer state machine 11B will be described below.

In a case where the event is stocked in the event table 112B (YES in S200), the processing program 111B of the intermediate-layer state machine refers to the state transition table 113B based on the stocked event and the state 114B of the intermediate-layer state machine (S210).

In a case where there is the guard condition in the state transition table 113B (YES in S220), the processing program 111B of the intermediate-layer state machine refers to the state of the lower layer (S230) and updates the state (S240). On the other hand, in a case where there is no guard condition (NO in S220), the processing program 111B of the intermediate-layer state machine directly updates the state (S240).

In a case where it is determined that reflection to the upper layer is required (YES in S250), the processing program 111B of the intermediate-layer state machine notifies the upper layer of the event (S260).

On the other hand, in a case where the event is not stocked (NO in S200) or in a case where it is determined that the reflection to the upper layer is not required (NO in S250), the processing program 111B of the intermediate-layer state machine ends the processing at this time.

FIG. 12 is a flowchart illustrating an example of the processing of the upper-layer state machine 11D according to the first embodiment.

The state transition processing illustrated in the flowchart of FIG. 12 is executed by the CPU 14 executing the processing program 111D of the upper-layer state machine 11D. The state transition processing illustrated in FIG. 12 is executed when the states of the intermediate-layer state machines 11B and 11C transition.

In a case where the event is stocked in the event table 112D (YES in S300), the processing program 111D of the upper-layer state machine refers to the state transition table 113D based on the stocked event and the state 114D of the upper-layer state machine (S310).

In a case where there is the guard condition in the state transition table 113D (YES in S320), the processing program 111D of the upper-layer state machine refers to the state of the intermediate layer (S330), updates the state, and delivers control information to the various actuators 13 (S240).

On the other hand, in a case where there is no guard condition (NO in S320), the processing program 111D of the upper-layer state machine directly updates the state, and delivers the control information to the various actuators 13 (S340). Thereafter, the processing program 111D of the upper-layer state machine ends the processing.

On the other hand, in a case where the event is not stocked (NO in S300), the processing program 111D of the upper-layer state machine ends the processing at this time.

Next, the state update operations (S120, S220, and S340) in the flowcharts of FIGS. 10 to 12 will be described.

Figures 13B, 13C, 14A:
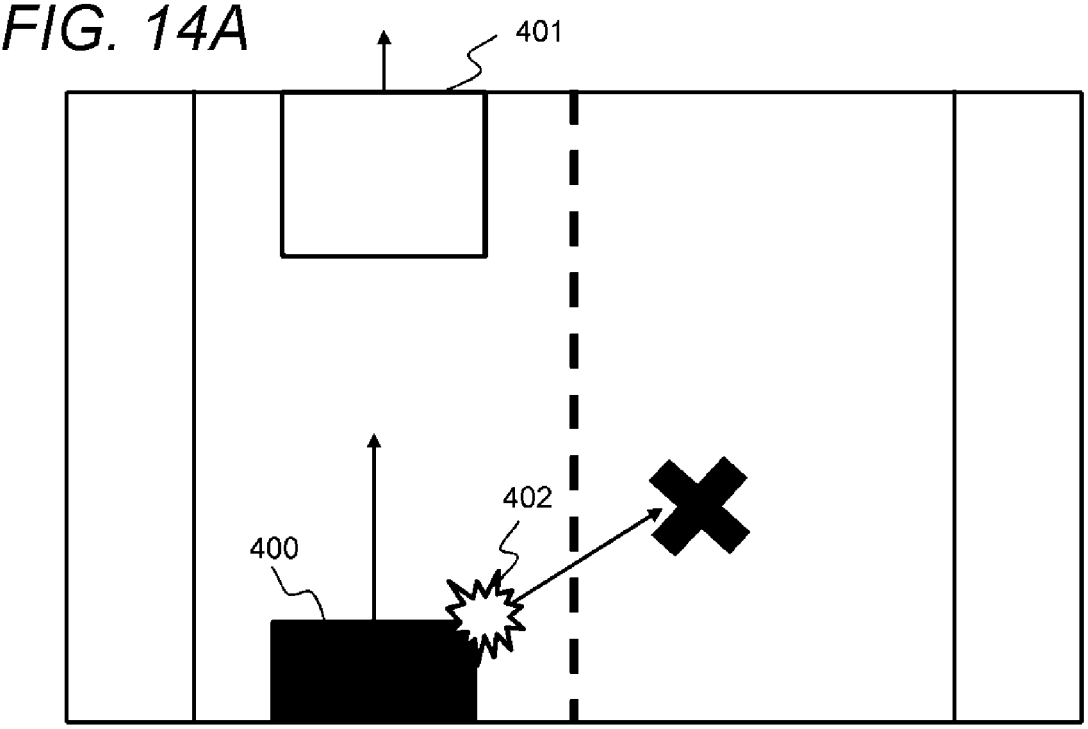
FIG. 13B is a diagram illustrating an example of a state list of the intermediate-layer state machine according to the first embodiment.
FIG. 13C is a diagram illustrating an example of a state list of the lower-layer state machine according to the first embodiment.
FIG. 14A is a diagram for describing an operation of the vehicle control device according to the first embodiment.

FIGS. 13A to 13C are diagrams illustrating examples of state lists of the upper-layer state machine 11D, the intermediate-layer state machines 11B and 11C, and the lower-layer state machine 11A according to the first embodiment, respectively. In these drawings, a left column represents the number of state machines, and a right column represents a current state of each state machine. In the state update, for example, in a case where the state transitions to the abnormal state in lower layer 1, the state transitions from the normal state to the abnormal state by the state update.

FIG. 14A is a diagram for describing an operation of a vehicle control device 1 according to the first embodiment.

As illustrated in FIG. 14A, it is assumed that a host vehicle 400 travels straight on a two-lane road on each side, and a preceding vehicle 401 travels in front of the host vehicle 400. It is assumed that the host vehicle 400 intends to overtake the preceding vehicle 401.

At this time, when a failure 402 occurs in a front right Radar 510 (see FIG. 9A) of the host vehicle 400, the lower-layer state machine 11A stocks the event in the event table 112A, refers to the state transition table 113A based on the event and the state 114A of the lower-layer state machine, and updates the state 114A of the state machine. In a case where reflection to the intermediate-layer state machines 11B and 11C is required, the lower-layer state machine 11A stocks the event in the event table of a right-side intermediate layer 520 (see FIG. 9A) including the front right Radar 510.

The state machine 11B or 11C of the right-side intermediate layer 520 (although the state machine is actually any one of the plurality of intermediate-layer state machines 11B and 11C, since it is not necessary to decide any one of these state machines in this description, reference signs are also used) refers to the state transition table 113B or 113C based on the event input from the lower-layer state machine 11A and the state 114B or 114C of the state machine. In a case where there is the guard condition in the state transition table 113B or 113C, the intermediate-layer state machine 11B or 11C refers to the state of the lower-layer state machine 11A included in the target intermediate layer, and update the state 114B or 114C of the state machine of the intermediate layer to the abnormal state. When the state 114B or 114C of the intermediate-layer state machine becomes the abnormal state, since reflection to the upper-layer state machine 11D is required, the intermediate-layer state machine 11B or 11C stocks the event in the upper-layer state machine 11D.

based on the event input from the intermediate-layer state machine 11B or 11C and the state 114D of the upper-layer state machine, the upper-layer state machine 11D to which the event has been input transitions the state 114D of the upper-layer state machine to the function restriction state by causing the state 114B or 114C of the intermediate-layer state machine referring to the state transition table 113D to transition to the abnormal state.

In a case where only a single intermediate-layer state machine is provided, it is assumed that only the failure 402 occurs in the front right Radar 510 of the host vehicle 400, the upper-layer state machine 11D becomes the "driver takeover waiting" state on the assumption that the failures occur in all the sensors, and the upper-layer state machine 11D outputs the control signal for notifying a driver that the abnormality of the sensor or the like occurs. On the other hand, in accordance with the ECU 1 according to the present embodiment, even though the failure 402 occurs in the front right Radar 510 of the host vehicle 400, the state 114D of the upper-layer state machine merely transitions to the function restriction state, and control to immediately notify the driver of a warning is not performed.

According to the present embodiment having the above-described configuration, the intermediate-layer state machine 11B or 11C divides the state of the lower-layer state machine 11A for each function of the vehicle system 1000 in association with the state of the lower-layer state machine 11A and outputs the state to the upper-layer state machine 11D, and the upper-layer state machine 11D receives the state of the lower-layer state machine 11A input from the intermediate-layer state machine 11B or 11C, refers to the state transition table 113D, and outputs a signal for controlling the vehicle system 1000.

More specifically, the intermediate-layer state machine 11B or 11C divides the state of the lower-layer state machine for each direction of the sensor 12 in the vehicle system 1000 or each target object targeted by the sensor 12, and outputs the state of the lower-layer state machine 11A to the upper-layer state machine 11D.

Therefore, it is possible to simplify the design of the state transitions of the state machines 11A to 11D constituting the ECU 1. The operations of the vehicle system 1000 can be switched only by referring to the state of the target intermediate-layer state machine 11B or 11C.

Figure 14B:
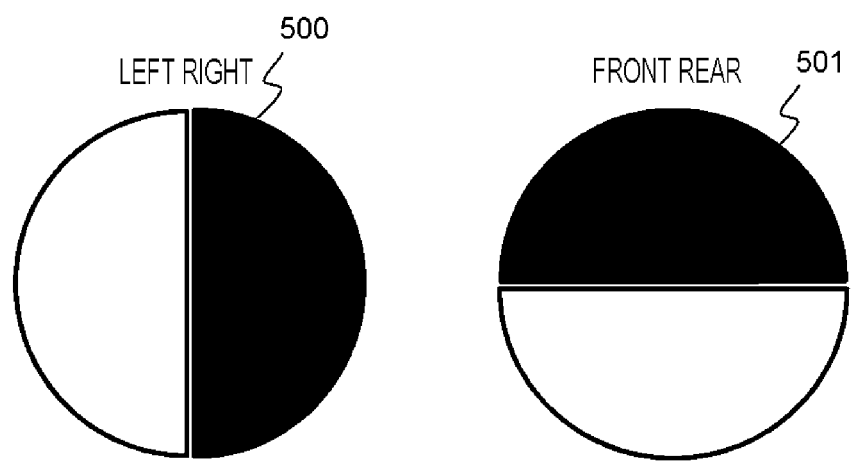
FIG. 14B is a diagram illustrating another example of the intermediate layer according to the first embodiment.

As already described above, how to provide the intermediate layer, more specifically, how to divide the intermediate layer is not limited to those described in the embodiment. As an example, in a case where two intermediate layers are provided as illustrated in FIG. 14B, not only the intermediate layer may be divided into the left and right sides as illustrated in the left part of FIG. 14B, but also the intermediate layer may be divided into front and rear sides as illustrated in the right part of FIG. 14B. In a case where the intermediate layer is divided into the front and rear sides, events from sensors located on the front side of the vehicle or having the detection directions of the sensors 12 on the front side of the vehicle when the intermediate layer is divided into the front and rear sides in the traveling direction from the center of the vehicle are input to a front-side intermediate layer 501. All the intermediate layers illustrated in the left and right portions of FIG. 14B may be provided, in other words, the intermediate layer may be divided into four in the front-back direction and the left-right direction.

Second Embodiment

Figure 15:
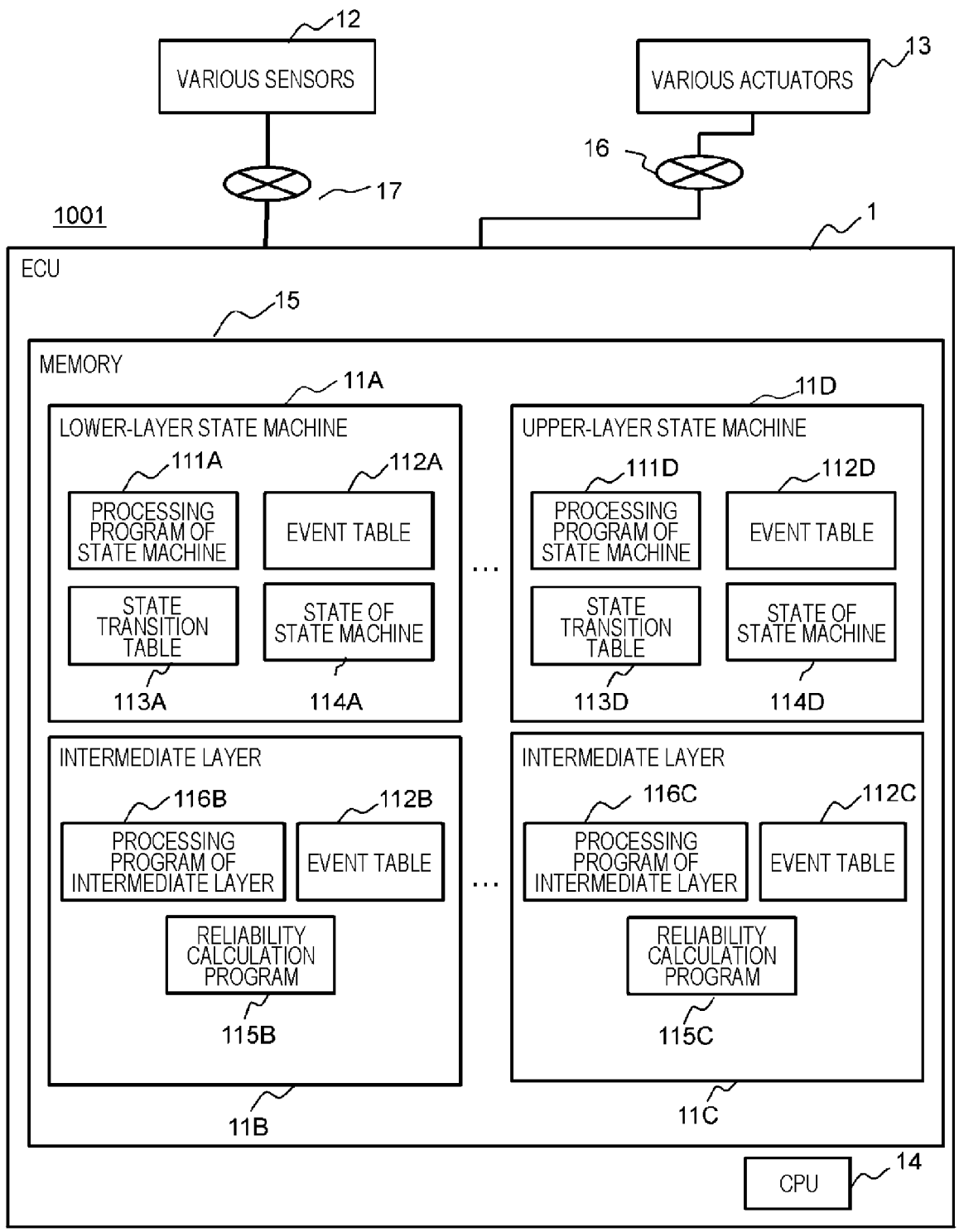
FIG. 15 is an overall configuration diagram of a vehicle control device according to the second embodiment.

FIG. 15 is an overall configuration diagram of a vehicle control device (ECU 1) according to a second embodiment. In the following description, the same components as those of the first embodiment described above are denoted by the same reference signs, and the description thereof will be simplified.

In a vehicle system 1001 according to the second embodiment, the ECU 1 which is the vehicle control device is different from the ECU 1 according to the first embodiment in the following points. That is, in intermediate layers 11B and 11C of a memory 15, processing programs 116B and 116C and reliability calculation programs 115B and 115C of the intermediate layers are stored instead of the processing programs 111B and 111C of the state machines, the state transition tables 113B and 113C, and the states 114B and 114C of the state machines.

Figure 16:
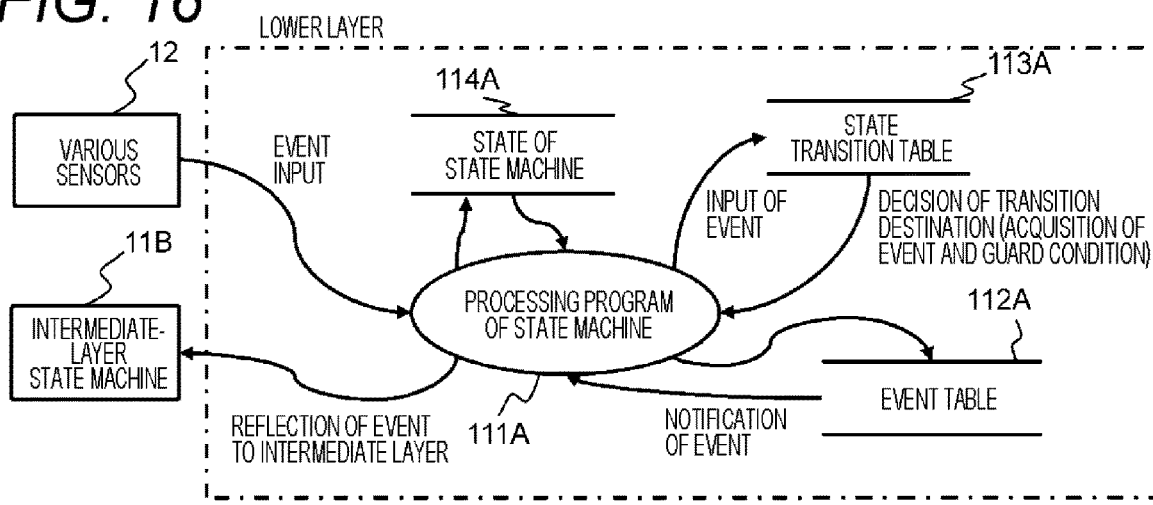
FIG. 16 is a diagram illustrating an example of a functional configuration of a lower-layer state machine according to the second embodiment.
Figure 17:
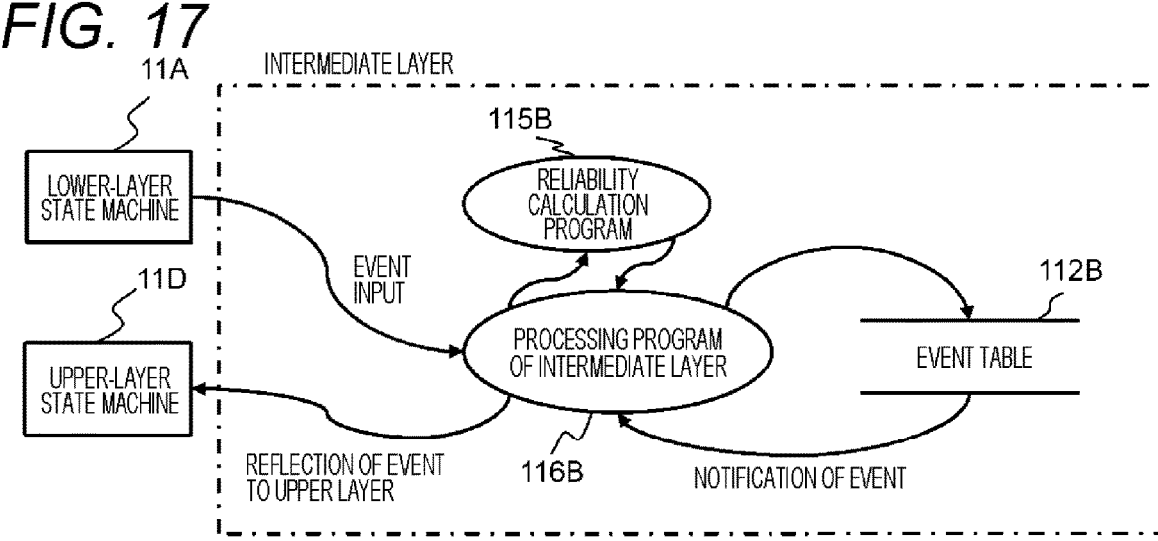
FIG. 17 is a diagram illustrating an example of a functional configuration of an intermediate layer according to the second embodiment.
Figure 18:
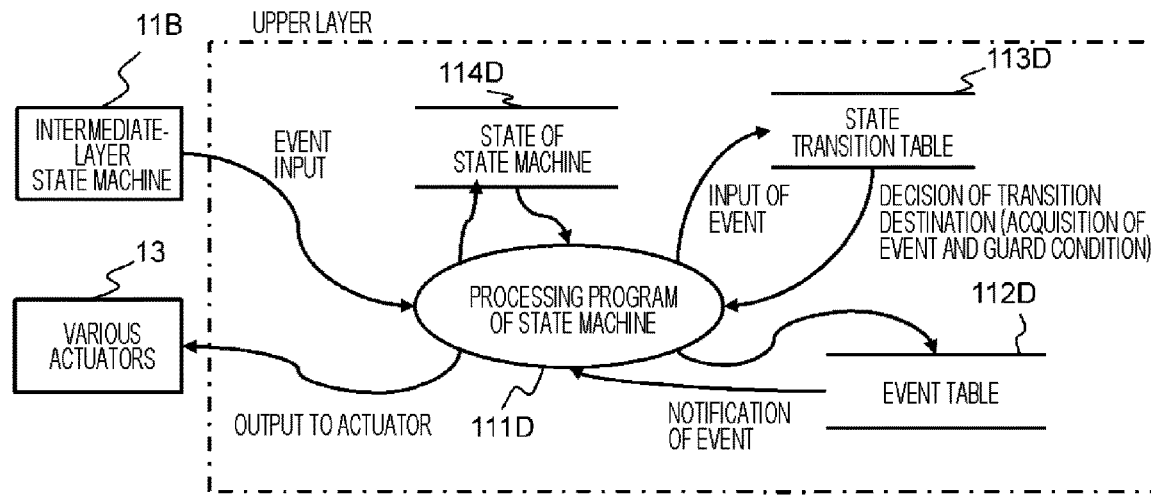
FIG. 18 is a diagram illustrating an example of a functional configuration of an upper-layer state machine according to the second embodiment.

FIG. 16 is a diagram illustrating an example of a functional configuration of a lower-layer state machine 11A according to the second embodiment, FIG. 17 is a diagram illustrating an example of a functional configuration of an intermediate layer 11B or 11C according to the second embodiment, and FIG. 18 is a diagram illustrating an example of a functional configuration of an upper-layer state machine 11D according to the second embodiment. Among the functional configurations illustrated in FIGS. 16 to 18, since the functional configurations illustrated in FIGS. 16 and 18 are the same as the functional configurations illustrated in FIGS. 2 and 4 of the first embodiment described above, the description thereof will be omitted here, and only the functional configuration of FIG. 17 will be described.

In FIG. 17, the processing program 116B of the intermediate layer (actually, a functional unit constituted by a CPU 14 that executes the processing program 116B of the intermediate layer) receives an event input (state notification information) from the lower-layer state machine 11A, stocks the event in an event table 112B or 112C, calculates degrees of reliability by the reliability calculation program 115B or 115C, and notifies the upper-layer state machine 11D of the event in a case where the degree of reliability is equal to or less than a threshold value. Details of the degree of reliability and a calculation method thereof will be described later.

Figure 19:
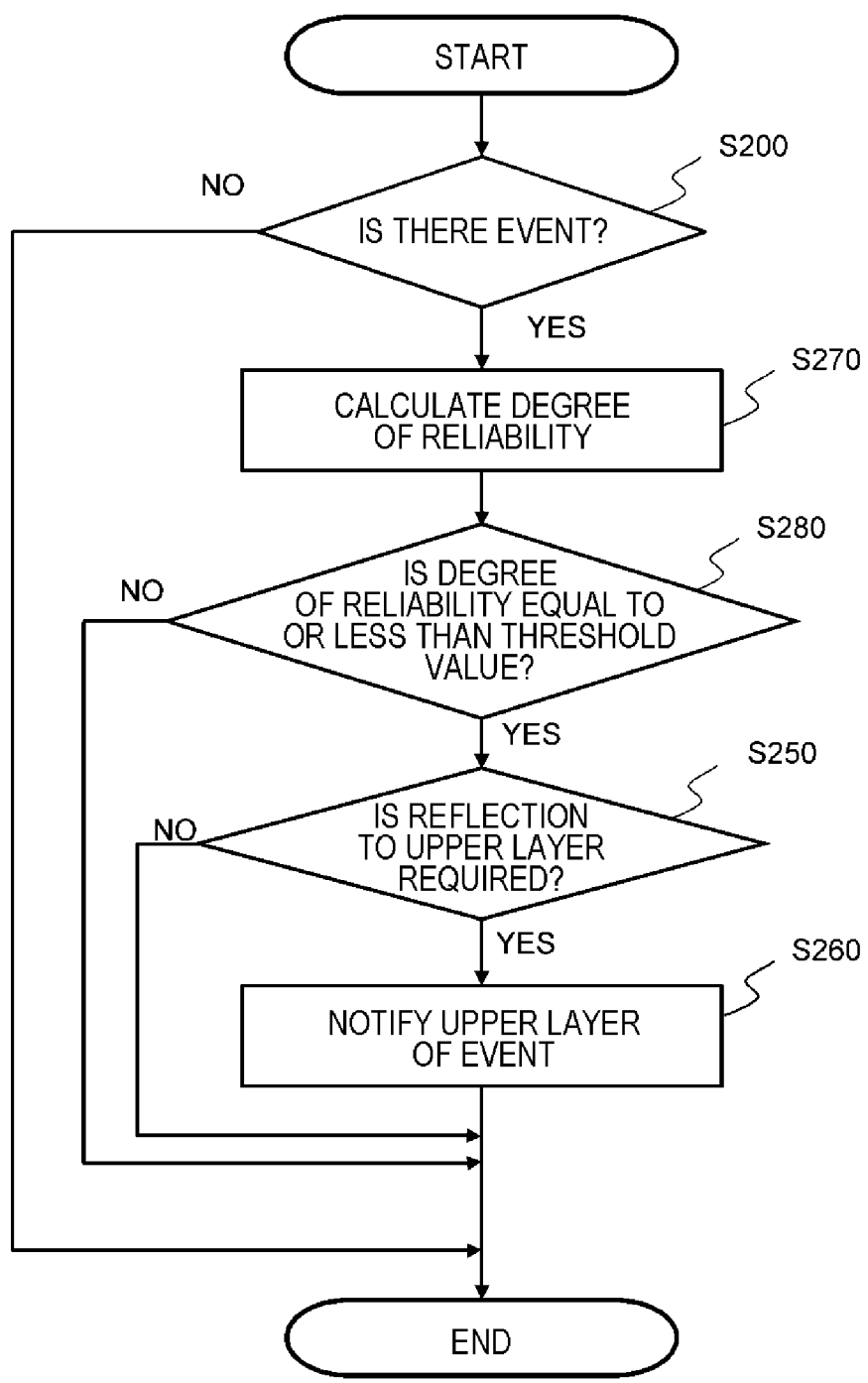
FIG. 19 is a flowchart illustrating an example of processing of an intermediate layer according to the second embodiment.

FIG. 19 is a flowchart illustrating an example of processing of the intermediate layer 11B or 11C according to the second embodiment. The state transition processing illustrated in the flowchart of FIG. 19 is executed when the state of the lower-layer state machine 11A transitions. In the present embodiment, since the tasks of processing of the lower-layer state machine 11A and the upper-layer state machine 11D are the same as those of the first embodiment, the description thereof will be omitted. Since the tasks of state transition processing executed by the processing programs 116B and 116C of the intermediate layers are substantially the same, the processing of the processing program 116B of the state machine of the intermediate layer 11B will be described below.

In a case where the event is stocked in the event table 112B (YES in S200), the processing program 116B of the intermediate layer calculates the degree of reliability of the sensor (S270). In a case where the degree of reliability calculated in S270 is equal to or less than a threshold value (YES in S280), and in a case where it is determined that reflection to the upper layer is required (YES in S250), the processing program 116B of the intermediate layer notifies the upper-layer state machine 11D of the event (S260).

On the other hand, in a case where the event is not stocked (NO in S200), in a case where the degree of reliability is equal to or less than the threshold value (NO in S280), and in a case where it is determined that the reflection to the upper layer is not required (NO in S250), the processing program 116B of the intermediate layer ends the processing.

In the present embodiment, the degree of reliability is a value indicating whether or not each of the various sensors 12 is performing a normal operation, and takes any one of a normal value and an abnormal value for each sensor. As an example, the degree of reliability is one when radio wave intensity received by the Radar is a normal value (in other words, measurement can be normally performed by the Radar), and the degree of reliability is zero when the radio wave intensity falls below the normal value by a predetermined value or more (including a case where the radio wave intensity is zero). In a case where the sensor is a camera, the degree of reliability becomes one when contrast of a video signal of the camera indicates a normal value, and the degree of reliability becomes zero when the contrast falls below the normal value by a predetermined value or more.

The processing program 116B or 116C of the intermediate layer calculates the degrees of reliability of the sensors 12 based on the event input from the lower-layer state machine 11A, and calculates the degrees of reliability in the intermediate layer by integrating the degrees of reliability. Accordingly, it can be said that the degree of reliability is a degree of redundancy indicating that the sensor 12 of which the event is input to the intermediate layer 11B or 11C via the lower-layer state machine 11A is normal. The threshold value is determined from the viewpoint of notifying the upper-layer state machine 11D of the event depending on how many sensors 12 have become abnormal.

Differences in an operation of the ECU 1 according to the present embodiment from the first embodiment will be described with reference to FIG. 9A.

A processing program of a right-side intermediate layer 520 (referred to as the processing program 116B) calculates the degrees of reliability of all the sensors 12 belonging to the right-side intermediate layer 520. As a result of the calculation, in a case where an average degree of reliability in the right-side intermediate layer 520 is equal to or less than a threshold value, it is determined whether or not notification to the upper-layer state machine 11D is required based on the number of sensors 12 of which the degree of reliability is equal to or less than the threshold value and the degree of reliability. At this time, the number of sensors equal to or less than the threshold value is one, but since the degree of reliability of the front right Radar 510 is zero, the event is stocked in the upper-layer state machine 11D.

The upper-layer state machine 11D to which the event has been input refers to the state transition table 113D based on the input event and the state 114D of the state machine. The upper-layer state machine 11D transitions the state 114D of the upper-layer state machine to the function restriction state based on the degree of reliability of the intermediate layer 11B or 11C.

Accordingly, in the present embodiment, the same effects as those of the first embodiment can also be obtained. The operations of the vehicle system 1001 can be switched only by calculating the degree of reliability of the target intermediate layer 11B or 11C.

The present invention is not limited to the aforementioned embodiments, and includes various modification examples.

For example, the aforementioned embodiments are described in detail in order to facilitate easy understanding of the present invention, and are not limited to necessarily include all the described components. Furthermore, some of the components of a certain embodiment can be substituted into the components of another embodiment, and the components of another embodiment can be added to the component of a certain embodiment. Furthermore, another component can be added, removed, and substituted to, from, and into some of the components of the aforementioned embodiments.

Furthermore, control lines and information lines illustrated are considered to be necessary for the description, and not all the control lines and information lines in a product are necessarily illustrated. Almost all the configurations may be considered to be actually connected to each other.

REFERENCE SIGNS LIST 1000, 1001 vehicle system
1 ECU
11A lower-layer state machine
11B, 11C intermediate-layer state machine
11D upper-layer state machine
14 CPU
15 memory
111A, 111B, 111C, 111D processing program of state machine
113A, 113B, 113C, 113D state transition table
114A, 114B, 114C, 114D state of state machine
115B, 115C reliability calculation program
116B, 116C processing program of intermediate layer

The invention claimed is:

1. A vehicle control device that controls a vehicle, the vehicle control device comprising:
a plurality of sensors;
an electronic control unit (ECU) that is communicatively coupled to the plurality of sensors, wherein the ECU includes a first state machine and a second state machine that are hierarchized, and an intermediate layer provided between the first state machine and the second state machine; and
a memory that is communicatively coupled to the ECU, wherein the memory stores:
a state transition table for the first state machine,
a state transition table for the second state machine,
a current state of the first state machine, and
a current state of the second state machine,
wherein the ECU is configured to:
receive an event input from the plurality of sensors,
determine, using the memory, the current state of the first state machine,
determine, using the memory, a new state of the first state machine based on the current state, the state transition table for the first state machine and the event input,
store, using the memory, the new state of the first state machine as the current state of the first state machine,
selectively output the event input and the current state of the first state machine to the intermediate layer based on the state transition table of the first state machine,
in response to the event input being received by the intermediate layer, determine a current state of the intermediate layer based on the new state of the first state machine and,
selectively output the event input and the new state of the first state machine to the second state machine based on the current state of the intermediate layer,
in response to the event input being received by the second state machine,
determines, using the memory, the current state for the second state machine,
determines, using the memory, a new state of the second state machine based on the input event, the new state of the first state machine and the transition table of the second state machine, and
controls an actuator of the vehicle based on the new state of the second state machine.

2. The vehicle control device according to claim 1, wherein the ECU is further configured to:
determine whether a guard condition is satisfied based on the current state of the intermediate layer and the event input, and
selectively output the event input and the new state of the first state machine to the second state machine based on the guard condition.

3. The vehicle control device according to claim 1, wherein the intermediate layer is a state machine.

4. The vehicle control device according to claim 1, wherein the ECU selectively outputs the event input to the second state machine based on a relationship between a first value obtained from the new state of the first state machine and a predetermined threshold value.

5. The vehicle control device according to claim 4, wherein the first state machine is among a plurality of first state machines,
wherein the first value is a number of the plurality of the first state machines in a predetermined state.

6. The vehicle control device according to claim 1, wherein the ECU is further configured to:
divide the new state of the first state machine for each direction of the plurality of sensors to generate a result, and
selectively output the event input to the second state machine based on the result.

7. A non-transitory computer readable storage-medium storing instruction for controlling a vehicle,
the instructions when executed by an electronic control unit (ECU) cause the ECU to execute a method comprising:
storing information in a memory, wherein the information includes:
a state transition table for a first state machine of the ECU,
a state transition table for a second state machine of the ECU,
a current state of the first state machine, and
a current state of the second state machine;
receiving an event input from a plurality of sensors;
determining, using the memory, the current state of the first state machine;
determining, using the memory, a new state of the first state machine based on the current state, the state transition table for the first state machine and the event input;
storing, using the memory, the new state of the first state machine as the current state of the first state machine;
selectively outputting the event input and the current state of the first state machine to an intermediate layer of the ECU based on the state transition table of the first state machine;
in response to the event input being received by the intermediate layer, determining a current state of the intermediate layer based on the new state of the first state machine;
selectively outputting the event input and the new state of the first state machine to the second state machine based on the current state of the intermediate layer;
in response to the event input being received by the second state machine, determining, using the memory, the current state for the second state machine,
determining, using the memory, a new state of the second state machine based on the input event, the new state of the first state machine and the transition table of the second state machine, and controlling an actuator of the vehicle based on the new state of the second state machine.

\* \* \* \* \*